United States Patent [19]

Yue

[11] 4,261,794
[45] Apr. 14, 1981

[54] RADIATION SHIELDING FOR ELECTRIC PENETRATION ASSEMBLIES

[75] Inventor: David D. Yue, Huntington Beach, Calif.

[73] Assignee: Bunker Ramo Corporation, Oak Brook, Ill.

[21] Appl. No.: 876,501

[22] Filed: Feb. 9, 1978

[51] Int. Cl.² ............................................. G21C 17/00
[52] U.S. Cl. ................................................. 176/19 R
[58] Field of Search ................... 250/515, 517, 518; 176/19 R, 19 EC, 19 J, DIG. 2

[56] References Cited

U.S. PATENT DOCUMENTS

| | | | |
|---|---|---|---|
| 2,858,451 | 10/1958 | Silversher | 250/515 |
| 2,911,343 | 11/1959 | Braffort et al. | 176/DIG. 2 |
| 2,942,116 | 6/1960 | Axelrad | 250/518 |
| 3,012,956 | 12/1961 | Currier, Jr. et al. | 250/515 |
| 3,028,497 | 4/1962 | Tengsater | 250/515 |
| 3,050,624 | 8/1962 | Janner | 176/19 R |
| 3,086,931 | 4/1963 | Long et al. | 176/DIG. 2 |
| 3,389,258 | 6/1968 | Reed et al. | 250/517 |
| 3,717,765 | 2/1973 | Hiller | 176/19 R |

OTHER PUBLICATIONS

"Coping with Radiation in Nuclear Power Plants," H. F. Reed, Conference Paper, IEEE, N.Y., (6/13/67).

Primary Examiner—S. A. Cangialosi
Attorney, Agent, or Firm—F. M. Arbuckle; A. Freilich

[57] ABSTRACT

A cylindrical electric penetration assembly carrying instrumentation leads from the interior of a nuclear reactor and having thin layers of polyethylene and lead radiation shielding installed at both its entrance and exit regions, the shielding layers being separated by a large hollow cavity located inside the central portion of the penetrator nozzle. Each layer attenuates and extinguishes either gamma ray or neutron radiation emanating from the reactor's core. The combination of the shielding and central air pocket prevents excessive radiation leakage through the penetration assembly and excessive heating inside the penetration nozzle.

9 Claims, 3 Drawing Figures

RADIATION SHIELDING FOR ELECTRIC PENETRATION ASSEMBLIES

BACKGROUND OF THE INVENTION

The invention relates to radiation shielding for drywell containment electric penetration assemblies in nuclear reactor facilities.

A stationary nuclear power generating station is designed and used to sustain nuclear fission in a self-supporting chain reaction, thereby providing a source for the production of a large amount of gamma, neutron, and other particulate and electromagnetic radiation. Should there occur an accident involving loss of coolant, an even higher level of radiation will result. This radiation is potentially harmful and heavy shielding around the interior of the reactor consequently is required to protect operating personnel and equipment in the vicinity of the facility from being exposed to excessive and possibly harmful doses of radiation. In monitoring the activity of the core of uranium or other fissionable material located inside the reactor, it is necessary for instrumentation leads or conductors to be brought out from the radioactive area through the wells of the nuclear reactor face. The leads serve to connect an instrument such as a thermocouple within the radioactive area to a device such as a potentiometer located outside the containment wall of the nuclear generator facility. A drywell penetrator assembly conventionally is used to pass the electric conductors or cables through an opening in the well interfacing the nuclear reactor with those interior areas of the facility to which authorized persons are permitted access. For a safe level of radiation leakage to be maintained, it is essential therefore that the penetration assembly itself not constitute a channel or window through which the harmful radiant energy can possibly escape either directly or by scattering. Additional shielding consequently must be provided both inside and about the penetration assembly in order to attain a level of protection that does not destroy the effectiveness of the uninterrupted portion of the protective shielding wall that has been constructed around the contaminated room.

Radioactivity present within a nuclear reactor installation can be classified into at least four categories of radiation and subatomic particle emissions, each having different characteristics. The four types of radioactivity are alpha particles, beta particles, gamma rays and neutrons. It has been found that relatively simple radiation shields with individual thicknesses of but a few hundredths of an inch effectively prevent leakage of alpha and beta particles. In contrast, gamma rays and neutron emissions possess tremendous penetrating power and can be attenuated or controlled only by inserting appreciable layers of various appropriate materials within the containment shield. Although no single shielding material in the prior art has proved capable of attenuating or extinguishing all four types of radioactivity at the same time, any arrangement or combination of shielding materials which can control and absorb gamma rays and neutrons is generally regarded sufficient to extinguish alpha and beta particles. Therefore, consideration of the latter two categories of particle radiation usually may be discounted when confronting the problem of designing an effective protective radiation casing around the instrumentation leads.

In the prior art, the cables or pipes containing the instrumentation leads extending from the contaminated interior of the reactor were necessarily bent into assorted non-rectilinear shapes in an effort to prevent the linear passage of radiation through the containment wall. Thus in a few instances, cables would first be formed into an S-shape, then fed through the drywell containment wall and finally sealed appropriately by injecting suitable thermoplastic or thermosetting materials around the cables in an effort to prevent the scattering of neutron and gamma radiation. Because of the sealing around the cables, however, it was not possible to monitor the potential gas leakage rate seeping through the interfaces either between the cables and the molded materials or between the copper conductors and the cable-insulating materials. It was believed therefore that the continuous expansion and contraction of the molded materials due to the heating and cooling of the adjacent cables when the reactor was in operation contributed to a potential source of radiation leakage in the prior art. Furthermore, in an effort to maximize the protection against harmful radiation, prior art penetration assemblies frequently would have to be filled completely, albeit uneconomically, throughout their lengths by layers of material suitably capable of controlling the neutron and gamma ray emissions. The employment of this procedure, however, contributed to increased overheating of the cables embedded inside the penetration nozzle.

BRIEF SUMMARY OF THE INVENTION

The present invention is directed to a novel electric penetration assembly providing effective yet economical shielding protection against both fast neutron and high-energy gamma radiation emissions inside a nuclear reactor. The invention takes advantage of a reducing effect that radiation has been found to undergo when being transmitted through a cylindrical-shaped duct or penetration nozzle. The amount of shielding materials required to be installed for protection and safety purposes within the duct or penetration assembly therefore can be correspondingly reduced. Furthermore, adequate spacing can be provided inside the penetration nozzle thus allowing excessive heat to be efficiently dissipated by convection, thereby assuring that the maximum allowable temperature within the nozzle is not exceeded. The invention also provides a means whereby all potential paths of radiation and gas leakage may be monitored.

In a preferred embodiment of the invention, an electric penetration assembly comprises a cylindrical nozzle pipe closed at both ends. The assembly itself is mounted in the wall between contaminated and uncontaminated areas located within the nuclear reactor. Dielectric tubes containing electrical leads or cables connecting instruments used in measuring the performance of the reactor pass longitudinally through the length of the assembly. The assembly is blocked near both its entrance and exit regions by two adjacent single layers of relatively thin lead and polyethylene shielding, which are themselves separated and reinforced by iron shield plates. The lead and polyethylene layers are designed to attenuate or capture the high energy gamma ray and neutron radiation emanating from the reactor's core and which subsequently leak through the nozzle assembly. Within the center portion of the penetrator assembly, a large hollow region between the lead the polyethylene slabs is left purposely vacant. Radiation passing through this empty cylindrical chamber undergoes a natural reduction in intensity thereby producing a diminished but safe dose rate. In this manner, the amount of shielding within the penetrator nozzle may be optimally reduced to effect significant cost savings.

The novel features of the invention are set forth with particularity in the appended claims. The invention will be best understood from the following description when read in conjunction with the accompanying drawings.

DESCRIPTION OF THE PREFERRED EMBODIMENT

Figure 1:
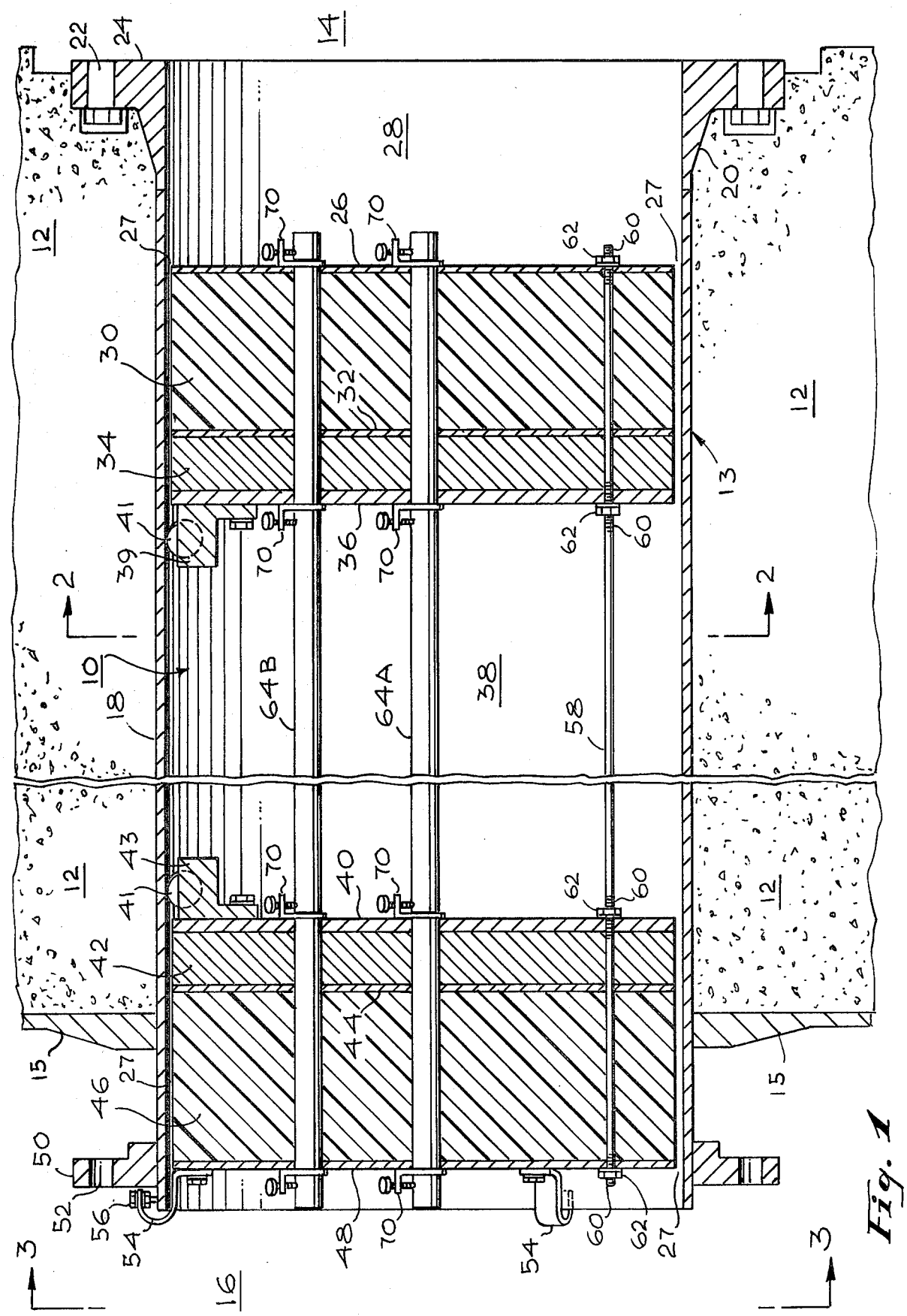
FIG. 1 is a fragmentary sectional view taken along the center plane of an electric penetrator assembly mounted in a containment wall of a nuclear reactor separating a contaminated room from an uncontaminated room.

Attention is now directed to FIG. 1 which illustrates an electric penetration assembly or nozzle 10 mounted in and extending through a thick containment wall 12 constructed between two rooms or areas 14, 16 located within the interior of a nuclear reactor facility. After nozzle 10 has been inserted and mounted, it is welded to a plate 15 secured to the face of wall 12. Area 14 is that portion of the nuclear reactor facility wherein large quantities of neutron, gamma and other potentially harmful particulate and electromagnetic radiation are released from a core of uranium or other fissionable material (not shown). Personnel operating the reactor facility work in room 16, which is adjacent to contaminated area 14, and consequently must be shielded in some manner from the harmful radiation emanating from area 14. For that purpose, a thick shield or containment wall 12 is constructed between the two areas 14, 16 thereby providing a means for primary protection. Containment wall 12 is composed of and includes materials such as lead plates or concrete of considerable thickness; lead and concrete having been found to be suitable materials for protection against radiation since both possess high radiant energy absorption properties.

The present invention comprises a drywell penetration assembly 10, which is mounted in shielding wall 12. Assembly 10 itself is comprised of a cylindrical pipe or casing structure 13 which houses a removable shield assembly 18. Casing 13 flares radially outward at one end of penetration nozzle assembly 10 to form a weld neck flange 20 having a lip portion 24. Flange 20 bears against the interface between contaminated area 14 and shielding wall 12. A plurality of fasteners 22, such as standard screws or bolts, are threaded through the lip portion 24 of weld neck flange 20 and provide a means for attaching a header plate (not shown) to one end of assembly 10. The weld neck flange 20 portion of penetration assembly 10 circumscribes a hollow chamber or cavity that is located within the interior of assembly 10 forming an entrance region 28 which in effect opens into contaminated area 14.

The shield assembly 18 includes a first iron shield plate 26, which is circularly shaped, having a thickness on the order of 0.125 inches and a diameter nearly equal to the inside diameter of iron casing 18 of assembly 10. Plate 26 is positioned transversely and perpendicularly to the longitudinal axis of penetration nozzle 10, thus forming a closed end which almost completely blocks the interior of assembly 10. A very small annular air pocket 27 lying between the outer circumference of iron plate 26 and the inner circumference of casing wall 13 is purposely left vacant to provide an air space extending throughout the length of assembly 10. When penetrator assembly 10 is in operation, the heat generated by the nuclear radiation being transmitted through the assembly causes the expansion of iron plate 26 and substantially closes the annular gap 27. The providing of a hollow space 27 about plate 26 or, for that matter, any other body positioned inside assembly 10, protects the walls of casing 13 from possible buckling and preserves the structural integrity of assembly 10.

The shield assembly 18 further includes a layer of plastic 30, such as polyethylene, installed immediately adjacent to the first iron shield plate 26 on the side facing opposite entrance region 28. In the preferred embodiment, the polyethylene 30 is packed in one-inch-thick slabs or sheets almost completely filling a volume extending approximately seven inches wide inside the iron casing 13 which mantles drywell penetrator 10. As noted above, annular air pocket 27 bounds the outer circumference of polyethylene layer 30. Because of its high content of hydrogen, polyethylene in suitable thicknesses has proven capable of functioning as an effective shield against neutron radiation. In effect, the polyethylene slabs 30 can attenuate fast-moving neutrons and also extinguish slow-moving or thermal neutrons. This first layer of polyethylene 30 is bounded immediately by a second iron shield plate 32, which is identical in both size and dimensions to the first shield plate 26. This second shield plate 32 is positioned parallel to plate 26 at a right angle tranvsverse to the longitudinal axis of assembly 10. The obverse side of circular-shaped shield plate 32 is bounded by a dense material 34, such as tungsten or lead slabs. Both tungsten and lead have been discovered to be suitable for utilization in effectively intercepting gamma rays penetrating therein. Neutrons, on the other hand, are capable of passing unimpeded through the two metals. In the preferred embodiment, a first layer of lead shielding 34 having a uniform thickness of approximately three inches and blocking nearly the entire radial width inside casing 13 is installed. By using lead, one may avoid the relatively-excessive inelastic scattering of neutrons found to occur whenever tungsten is employed. A third circular-shaped iron shield plate 36 is positioned immediately adjacent to the layer of lead shielding 34. Having a thickness double that of first and second plates 26, 32, this third iron shield 36 is situated perpendicular to the longitudinal axis of penetration nozzle 10 and almost completely blocks the space within the walls of casing 13. The obverse face of iron shield plate 36 bounds a hollow air pocket chamber 38 which extends for an indefinite distance throughout the central portion of penetrator nozzle 10. The precise lengths of this cylindrical cavity 38 is dictated by the dimensions of drywell penetration nozzle 10, the length of which has been noted to be approximately equal to the width or thickness of containment wall 12.

A long nozzle assembly 10 necessarily requires that chamber 38 consequently occupy a longer distance than would be necessitated by a shorter nozzle. Although no materials such as lead or polyethylene are used as shielding to block the interior of hollow cavity 38, the level of gamma ray and neutron radiation nevertheless is decreased due to the abovementioned reduction or "ducting" effect. This effect causes the dose rates of both the gamma rays and neutrons to be less at the exit end of the cylindrical nozzle 10 than at the entrance region 28 of the nozzle 10. Thus, when a distributed source of neutrons is transmitted through a cylindrical duct such as hollow chamber 38, the ratio of the transmitted neutron flux to the original neutron flux may be represented mathematically as follows:

$$\frac{\Phi}{\Phi_o} = \frac{10}{8} e^{-\overline{\Sigma}L} \left(\frac{d}{L}\right)^2$$

where $\Phi$=transmitted neutron flux through the cylindrical duct, $\Phi_o$=original neutron flux before the transmission, $\overline{\Sigma}$=average removal cross section (cm$^{-1}$) for material in the duct ($\simeq 0$ for air), L=length of the duct (cm) and d=diameter of the duct (cm). Similarly, when a distributed source of gamma radiation is transmitted through a cylindrical duct such as hollow chamber 38, the ratio of the transmitted gamma ray flux to the original gamma ray flux depending upon the type of emitter used may be expressed as follows:

$$\frac{N}{N_o} = \frac{1}{2}\left(\frac{r}{L}\right)^2 B e^{-\overline{\mu}x} \text{ for a Spherical Emitter;}$$

$$\frac{N}{N_o} = \left(\frac{r}{L}\right)^2 B e^{-\overline{\mu}x} \text{ for a Cosine Emitter;}$$

and $$\frac{N}{N_o} = 1.268\left(\frac{r}{L}\right)^2 B e^{-\overline{\mu}x} \text{ for a Fermi Emitter;}$$

where N=transmitted gamma ray flux through the cylindrical duct, N$_o$=original gamma ray flux before the transmission, r=radius of duct (cm), L=length of duct (cm)$\overline{\mu}$=average attenuation coefficient (cm$^{-1}$) for material in the duct ($\simeq 0$ for air), X=thickness of material in the duct (cm), and and B=build up factor of material in the duct ($\simeq 1$ for air). Calculations indicate that for a five-foot long, sixteen-inch diameter penetration nozzle without any internal shielding whatsoever present, the transmission flux ratios of distributed sources of neutrons and gamma radiations are less than nine and one percent respectively. Considerable amounts of shielding materials therefore may be conserved by not having to fill hollow chamber 38 with layers of lead or polyethylene. Nuclear safety standards may be successfully complied with by the installation of only as much shielding material as is necessary to further reduce and diminish the radiation dosage rates being transmitted through penetration assembly 10. An additional consequence resulting from the existence of hollow chamber 38 is that sufficient heat can be allowed to dissipate by means of convection thereby assuring that the maximum allowable temperature between penetration nozzle 10 and containment wall 12 is not exceeded.

In the preferred embodiment, the shield assembly 18 is supported on three radial support dollies 39 (FIG. 2) which enable the shield assembly to be inserted into and removed from the casing 13. The three dollies 39 are mounted along the circumferences of the obverse face of third shield plate 36; each dolly 39 containing two spherical ball bearings 41 which engage the inner wall of casing 13. Bearings 41 permit the interior of assembly 10 to slide freely in and out, thereby facilitating easy access for maintenance purposes. Three additional and identical radial support dollies 43 (shown in FIG. 1) are similarly mounted upon the face of a fourth iron shield plate 40 located at the other end of cavity 38. Shield plate 40 is a twin of the third plate 36 in size and dimensions; it is circular-shaped and also is positioned both perpendicularly and transversely to the longitudinal axis of penetrator 10. The thickness of fourth iron plate 40 is approximately 0.25 inches and the plate almost completely blocks the inside passageway of penetrator assembly 10 except for annular expansion gap 27. Plate 40 separates hollow chamber 38 from a second layer of lead shielding 42. Lead shielding 42 consists of lead slabs packed in a circular configuration filling a three-inch-thick space between the inner surfaces of casing 13 immediately adjacent to shield plate 40. This second layer of lead 42 attenuates and further prevents the gamma radiation from continuing its passage through penetration nozzle 10. Bounding lead slabs 42 on their other side is a fifth shield plate 44 having dimensions similar to shield plates 26, 32. Iron plate 44 is circularly shaped with a diameter approximately equal to that of the penetrator nozzle's inside diameter less annular spacing 27. Since shielding plate 44 is positioned at a 90° angle transverse to the assembly's longitudinal axis, it too completely closes up the inner passageway of assembly 10. This fifth iron plate 44 also bounds a second layer of polyethylene 46, which is packed inside and throughout an adjacent segment of penetration assembly 10. The layer of polyethylene 46 is bordered on its second side by a sixth and final iron shield plate 48 installed at the exit region of nozzle 10. Identical to plate 44 in both size and configuration, shielding plate 48 is oriented perpendicularly to the penetration axis of assembly 10 thereby blocking the nozzle assembly.

Three brackets 54 (of which only two are illustrated by FIG. 1) connect shielding plate 48 to side wall iron casing 13, each bracket forming a U-shaped lip extending over and around the outer edge of casing 13. In the preferred embodiment, the brackets, one of which is located at the topmost position, are bolted equidistantly 120° apart from each other along the outer circumference of plate 48. Set screws 56 are threaded into the lip portion of each bracket 54 and can be tightened to thereby lock shield plate 48 securely into place. Thus plate 48 forms, in effect, the closed end of penetrator nozzle 10 at its exit region interface with uncontaminated area 16. In the preferred embodiment, a slip-on flange 50 extends radially outwards a short distance from iron shielding plate 48 around the outer side wall circumference of casing 18. A plurality of holes 52 are drilled completely through the edges of slip-on flange 50 and bolts (not shown) are threaded into the holes to secure flange 50 tightly against a header plate (not shown).

Figure 2:
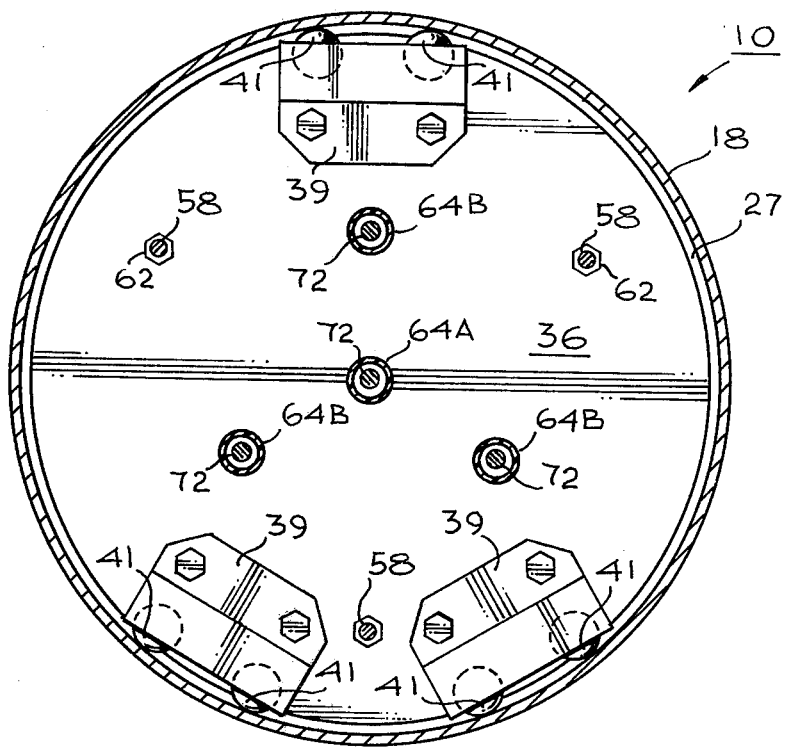
FIG. 2 is a side view, in section, taken on section lines 2—2 of FIG. 1.
Figure 3:
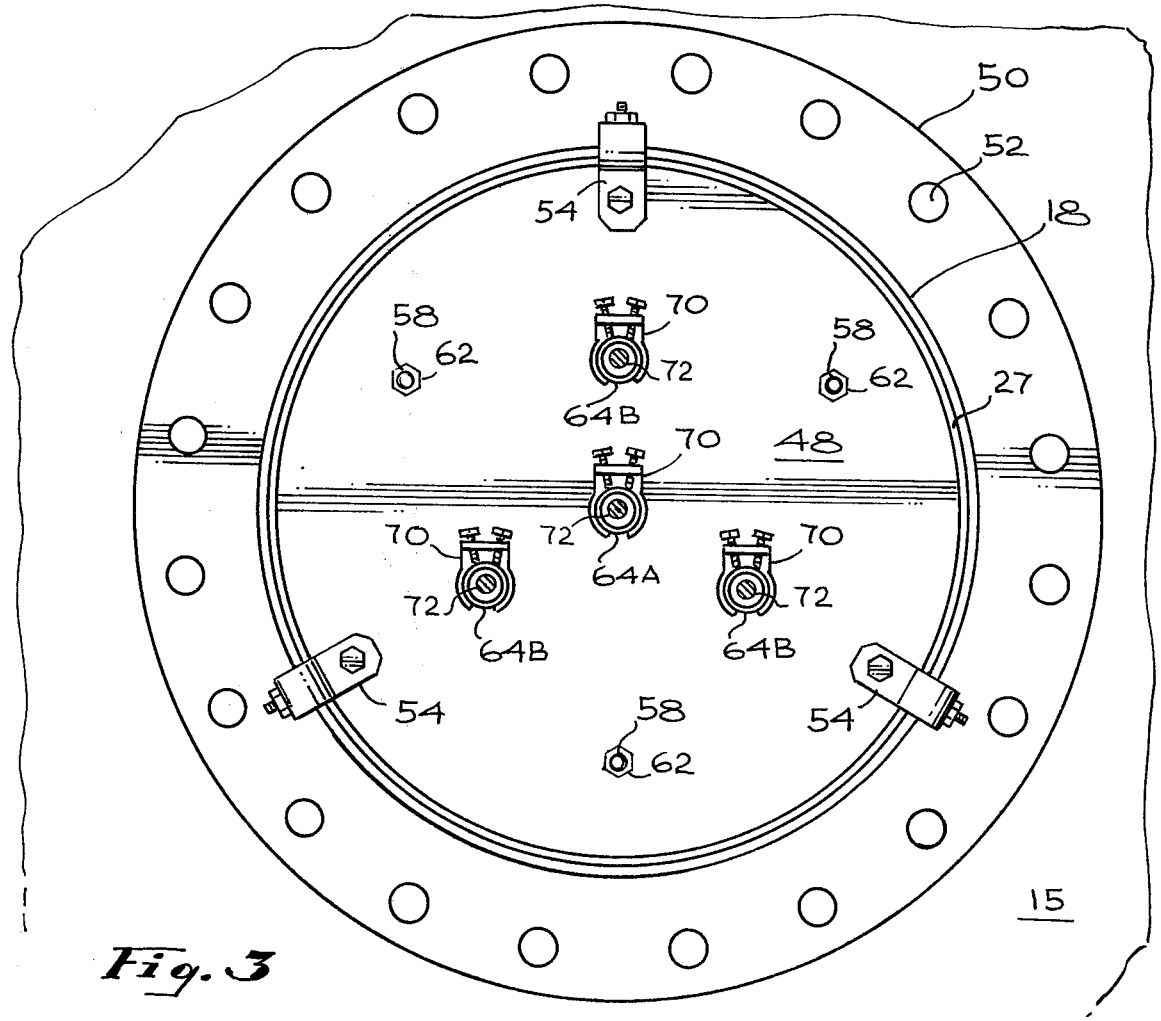
FIG. 3 is a plan view of one end of the penetration assembly taken on lines 3—3 of FIG. 1.

Three support rods 56 (of which only one is depicted in FIG. 1) extend longitudinally through the interior of electric penetration assembly 10 and serve to structurally hold together the various shielding plates to form the shield assembly 18. The rods 58 are positioned 120° from each other at an equal radial distance from the central axis running through the length of nozzle 10. In the preferred embodiment, each support rod 58 has a diameter on the order of approximately one-half inch. Threaded portions 60 are formed on those segments of each rod 58 immediately adjacent to the four iron shield plates 26, 36, 40, 48. Two pairs of jam nuts 62 screws onto the four threaded portions 60 of each rod 58 thereby coupling the first and second layers of lead shielding 34, 42 to the first and second layers of polyethylene shielding 30, 46 respectively. In addition to support rods 58, a plurality of narrow, hollow cylindrical tubes or passageway means 64A, 64B, each having a uniform circular cross-section, also extend longitudinally and rectilinearly through the interior of nozzle pipe assembly 10. Hollow tubes 64A, 64B are composed of a dielectric or other suitable non-conducting material and each contains at least one instrumentation lead or electrical cable 72 (shown in FIGS. 2 and 3) extending therethrough. Instrument leads 72 are employed to monitor activity within the reactor. As shown by FIGS. 2 and 3, there are four such tubes 64A, 64B in the preferred embodiment (of which only two are depicted in FIG. 1). A single tube 64A passes along the center penetration axis of assembly 10 and the remaining three tubes 64B are positioned 120° from each other at equal radial distances. One end of each of the four hollow tubes 64A, 64B opens to the entrance region 28 of assembly 10 facing radioactive area 14 while the other end of each tube opens to the uncontaminated area 16. Two pairs of standard fasteners 70, such as tube clamps and set screws, tightly secure each of the four tubes 64A, 64B into place. For purposes of clarity, fasteners 70 are not depicted in FIG. 2.

Although particular embodiments of the invention have been described and illustrated herein, it is recognized that modifications and variations may readily occur to those skilled in the art and, consequently, it is intended that the claims be interpreted to cover such modifications and equivalents.

The embodiments of the invention in which an exclusive property is claimed are described as follows:

1. An electric penetration assembly for carrying instrumentation leads used in monitoring performance of a nuclear reactor through a containment wall of said reactor, comprising:
   a tubular casing forming an exterior surface of said penetration assembly and having both an entrance region and an exit region;
   two radiation shielding assemblies installed inside said casing respectively at said entrance and exit regions, said assemblies separated by a large hollow chamber formed at a central region of said penetration assembly, said hollow chamber extending along a majority of the length of said casing which lies in said containment wall, and said chamber being substantially devoid of solid radiation shielding material; and
   a plurality of tubes containing instrumentation leads and completely extending the length of the interior of said penetration assembly, said tubes passing through both said radiation shielding assemblies on said hollow chamber, and opening into said entrance and exit regions.

2. An electric penetration assembly as recited in claim 1, further comprising:
   a small annular ring-shaped air pocket positioned between an inner surface of said tubular casing and said two radiation shielding assemblies.

3. An electric penetration assembly as recited in claim 1, wherein said two radiation shielding assemblies each comprise a first shielding material effective as a shield against high-energy gamma rays and a second shielding material effective as a shield against fast neutron radiation, said first and second shielding materials separated only by single thin iron plates.

4. An electric penetration assembly as recited in claim 3, wherein said two radiation shielding assemblies have circular cross-sections, said cross-sections nearly completely filling the width of said assembly.

5. An electric penetration assembly as recited in claim 3, wherein said first shielding material is a dense element, said element being lead or tungsten.

6. An electric penetration assembly as recited in claim 3, wherein said second shielding material is a plastic having a high content of hydrogen, said plastic being polyethylene.

7. Apparatus for diminishing radiation leakage emanating from a radioactive core of fissionable material, said fissionable material being isolated by a containment wall having an opening therein, said radioactive core forming a distributed source of neutron and gamma radiation which can stream through said opening of the containment wall, said apparatus comprising:
   a penetration nozzle comprising an elongated pipe having a hollow interior, said pipe extending through said containment wall opening substantially perpendicular to said wall; and
   at least two radiation shields supported in spaced relationship within said pipe, each shield having a cross-section conforming to the interior cross-section of said pipe and being comprised of at least two adjacent layers of different shielding materials for respectively extinguishing said neutron and gamma radiation leakage, and the hollow length of space between said shields being greater than the greatest width of the pipe and being substantially devoid of solid material.

8. The apparatus as recited in claim 7 wherein a first layer of said two adjacent shielding materials is comprised of a dense element, said element being lead or tungsten, said dense element being effective as a shield against high-energy gamma radiation.

9. The apparatus as recited in claim 8 wherein a second layer of said two adjacent shielding materials is comprised of a plastic having a high content of hydrogen, said plastic being polyethylene, said polyethylene being effective as a shield against fast neutron radiation.

* * * * *